(12) United States Patent
Chen et al.

(10) Patent No.: US 11,654,529 B2
(45) Date of Patent: May 23, 2023

(54) BURR TRIMMING DEVICE

(71) Applicant: INDUSTRIAL TECHNOLOGY RESEARCH INSTITUTE, Hsinchu (TW)

(72) Inventors: Zhi-Xiang Chen, Hsinchu (TW); Chia-Chung Sung, Hsinchu (TW); Cheng-Yu Chu, Hsinchu (TW); Jao-Hao Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 576 days.

(21) Appl. No.: 16/823,877

(22) Filed: Mar. 19, 2020

(65) Prior Publication Data

US 2021/0205954 A1 Jul. 8, 2021

(30) Foreign Application Priority Data

Jan. 2, 2020 (TW) ................................. 109100079

(51) Int. Cl.
*B24C 1/04* (2006.01)

(52) U.S. Cl.
CPC .................................. *B24C 1/045* (2013.01)

(58) Field of Classification Search
CPC .. B24B 9/18; B24B 9/20; B24B 19/26; B24B 19/265; B24B 23/04; B24B 23/043; B24B 27/0015; B24B 27/0038; B24B 55/02; B24C 1/045; B24C 1/083; B25J 11/005; B25J 11/0055; B25J 11/006; B25J 11/0065; B26D 2201/0053

USPC ....... 451/119, 121, 124, 125, 127, 139, 150, 451/155, 162, 163, 165, 178, 449, 910, 451/102

See application file for complete search history.

(56) References Cited

U.S. PATENT DOCUMENTS

| 4,836,722 A | 6/1989 | Kurita et al. |
| 6,086,294 A | 7/2000 | Danchine et al. |
| 2003/0021861 A1 | 1/2003 | Yamada |
| 2012/0184184 A1* | 7/2012 | Grosbois et al. ......... B24B 1/04 |
| 2016/0279836 A1 | 9/2016 | Schmand et al. |

(Continued)

FOREIGN PATENT DOCUMENTS

| CN | 101909843 | 12/2010 |
| CN | 102009443 | 4/2011 |
| CN | 204149392 | 2/2015 |

(Continued)

OTHER PUBLICATIONS

JP-2008030251-A translation (Year: 2008).*

(Continued)

*Primary Examiner* — Monica S Carter
*Assistant Examiner* — Abbie E Quann
(74) *Attorney, Agent, or Firm* — Amin, Turocy & Watson, LLP

(57) ABSTRACT

A burr trimming device includes a removing assembly and a directed spraying assembly disposed on a carrier, wherein the directed spraying assembly has a nozzle facing the removing assembly. The directed spraying assembly rapidly freezes objects such as burrs and then the removing assembly removes the hardened objects by coming into rigid contact therewith, thereby ensuring complete removal of the fine flexible burrs.

9 Claims, 7 Drawing Sheets

(56) References Cited

U.S. PATENT DOCUMENTS

2019/0217434 A1\* 7/2019 Adachi ............. B23Q 11/0003

FOREIGN PATENT DOCUMENTS

| | | |
|---|---|---|
| CN | 204160207 | 2/2015 |
| CN | 106182034 | 12/2016 |
| CN | 106392801 | 2/2017 |
| CN | 106670854 | 5/2017 |
| CN | 206678259 | 11/2017 |
| CN | 110154288 | 8/2019 |
| JP | 2008-030251 | 2/2008 |
| JP | 2008030251 A \* | 2/2008 |
| TW | 200927423 | 7/2009 |
| TW | 201209902 | 3/2012 |
| TW | M454887 | 6/2013 |
| TW | I616288 | 3/2018 |
| TW | I647062 | 1/2019 |

OTHER PUBLICATIONS

Chinese Office Action for Chinese Patent Application No. 202010064836.3 dated Jul. 1, 2022.
Taiwanese Office Action for Taiwanese Patent Application No. 109100079 dated Dec. 28, 2020.
Taiwanese Office Action for Taiwanese Patent Application No. 109100079 dated Jul. 8, 2020.

\* cited by examiner

BURR TRIMMING DEVICE

CROSS REFERENCE TO RELATED APPLICATIONS

This application claims priority to Taiwan Application Serial No. 109100079, filed Jan. 2, 2020, which is herein incorporated by reference.

BACKGROUND

1. Field of the Disclosure

The present disclosure relates to burr trimming devices, and more particularly, to a burr trimming device capable of removing flexible burrs.

2. Description of Related Art

Along with the rapid development of computer numerical control (CNC) technologies, the machining accuracy has been continuously improved and widely used in precision machining industries. However, machining objects such as vehicle steering wheels need to pass accuracy inspection regulations of quality management so as to ensure consistency of quality.

Currently, to fabricate a steering wheel, an injection molding device is automatically controlled by CNC to fabricate a body of the steering wheel. That is, a mold is used to shape a foam material into the body of the steering wheel. Therefore, during the fabrication process of the steering wheel, after demolding, burrs need to be removed from the body of the steering wheel so as to pass the accuracy inspection of quality management. Thereafter, the body of the steering wheel is covered with a film to form a required finished product.

Conventionally, burrs can be removed by various methods. For example, burrs can be removed manually. However, such a method leads to a limited accuracy of removal (e.g., uneven roughness, or fine burrs cannot be precisely removed) and therefore fails to meet the accuracy requirement of quality management. In addition, such a method is both time-consuming and labor-consuming and thus increases the fabrication cost and is not conducive to mass production. Alternatively, burrs can be removed by a scraper driven by a mechanical arm. However, the mechanical arm has a limited mechanical movement and cannot drive the scraper to remove burrs at an irregular area (e.g., a dead corner) of the steering wheel. Even if the scraper reaches the top of the burrs at the dead corner, the burrs cannot be completely removed from the bottom thereof due to the flexible property of the burrs made of the foam material, thus failing to meet the accuracy requirement of quality management.

Therefore, how to overcome the drawbacks of the prior art is becoming an urgent issue in the art.

SUMMARY

In view of the above-described drawbacks, the present disclosure provides a burr trimming device, which comprises: a carrier having a support frame and a base disposed on the support frame; a removing assembly disposed on the carrier, wherein the removing assembly has a vibrator disposed on the carrier, and the vibrator passes through the base and the support frame; and a directed spraying assembly disposed on the carrier and having a nozzle facing the removing assembly and a guiding member connected to the nozzle, wherein the guiding member is pivotally connected to the support frame.

According to the present disclosure, the directed spraying assembly rapidly freezes objects and then the removing assembly removes the objects by coming into rigid contact therewith, thus ensuring complete removal of the objects such as fine flexible burrs. Compared with the prior art, the present disclosure can change the type of the removing assembly as needed so as to easily adjust the hardness or sharpness of a knife. As such, the present disclosure facilitates to improve the burr trimming accuracy and leaves no fine burrs so as to meet the accuracy requirement of quality management.

DETAILED DESCRIPTION OF EMBODIMENTS

The following illustrative embodiments are provided to illustrate the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "up," "down," "right," "left," "forward," "backward," "first," "second," "on," "a" etc. are merely for illustrative purposes and should not be construed to limit the scope of the present disclosure.

Figure 1A:
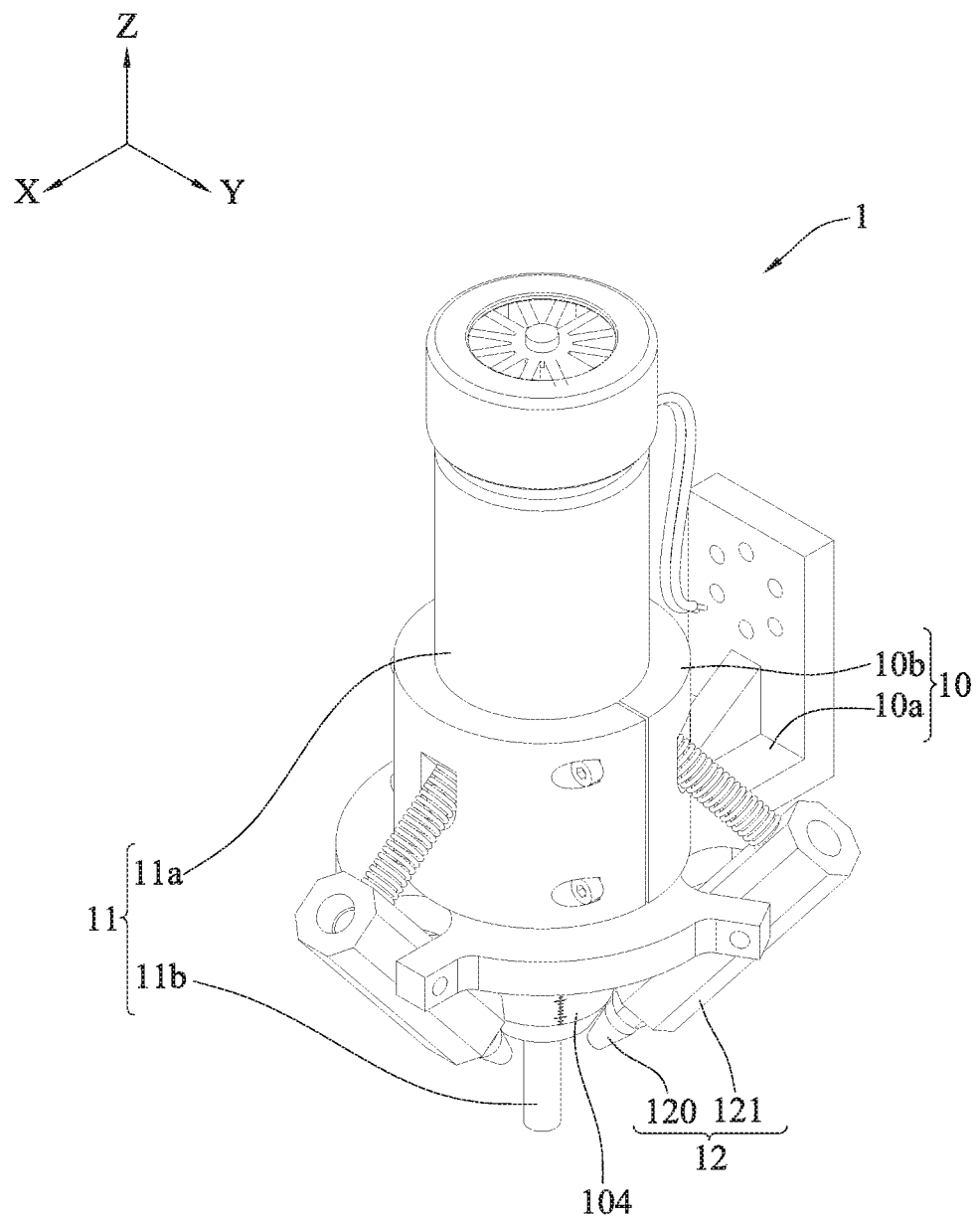
FIG. 1A is a schematic perspective view of a burr trimming device according to the present disclosure.
Figure 1B:
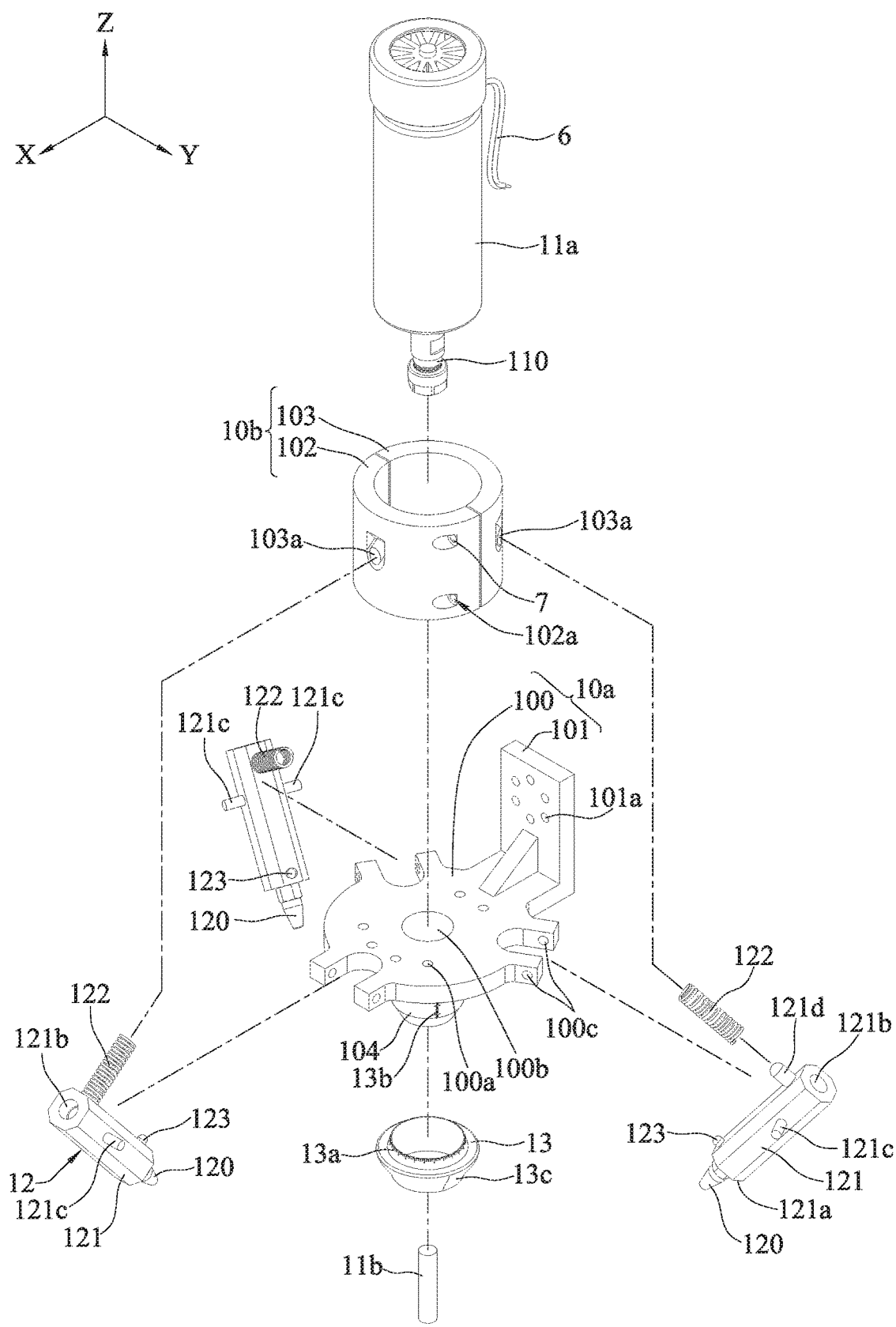
FIG. 1B is a schematic exploded perspective view of FIG. 1A.

FIGS. 1A and 1B are schematic perspective views of a burr trimming device 1 according to the present disclosure. As shown in FIGS. 1A and 1B, the burr trimming device 1 comprises a carrier 10, a removing assembly 11 disposed on the carrier 10 and at least one directed spraying assembly 12 disposed on the carrier 10.

In an embodiment, based on the configuration of the burr trimming device 1, an arrow X in the drawings indicates a forward or backward direction, an arrow Y in the drawings indicates a left or right direction, and an arrow Z in the drawings indicates an up or down direction. It should be understood that the orientations are used to illustrate the configuration of the embodiment and not intended to limit the present disclosure.

The carrier 10 has a support frame 10a and a base 10b disposed on the support frame 10a.

In an embodiment, the support frame 10a is in the shape of a chair and has a bottom portion 100 and a back portion 101 vertically connected to the bottom portion 100. A plurality of fastening holes 100a (six in FIG. 1B) are formed in the bottom portion 100 for fastening the base 10b with fastening members such as screws (not shown). A plurality of function holes 101a (six in FIG. 1B) are formed in the back portion 101 so as to connect the back portion 101 to another device such as a mechanical arm 2 through fastening members 8 such as screws, as shown in FIG. 2B.

Further, the base 10b has, for example, a cylinder sleeve shape and is fastened to an upper side of the bottom portion 100 of the support frame 10a. For example, the base 10b has two arc-shaped engaging portions 102, 103, which are fastened to the bottom portion 100 through fastening members such as screws (not shown). A plurality of holes 102a are formed in the two engaging portions 102, 103 and thus the two engaging portions 102, 103 are engaged with one another through fastening members 7 such as screws, as shown in FIG. 1B.

The removing assembly 11 is of an ultrasonic vibration type, which comprises a vibrator 11a and a knife 11b disposed on the vibrator 11a.

Figure 1C:
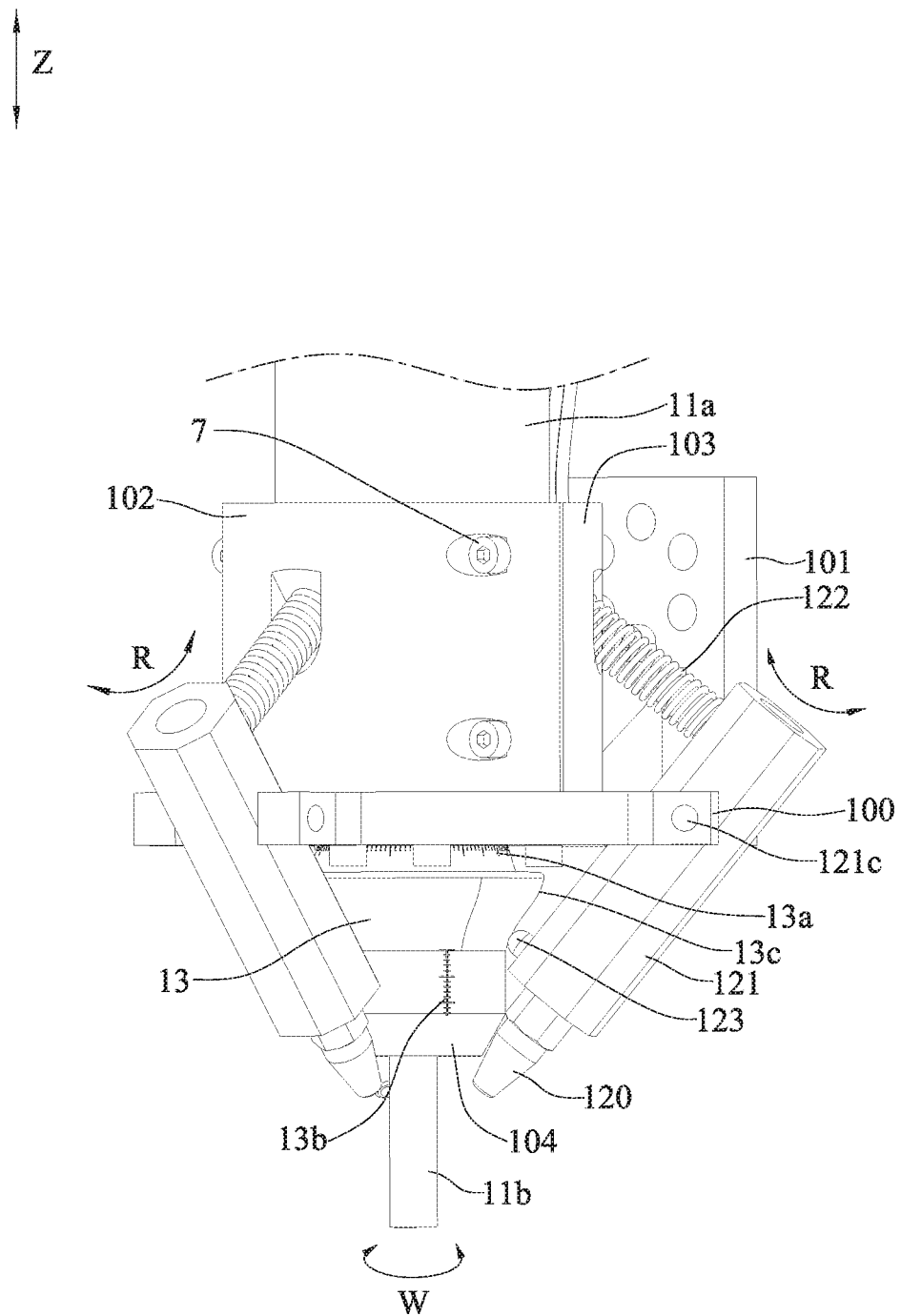
FIG. 1C is a schematic partial perspective view of FIG. 1A.

In an embodiment, the vibrator 11a is a high-frequency vibrator such as an ultrasonic shaft, one end thereof has a mounting portion 110 and the other end thereof is electrically connected to an electronic device such as a power supply or controller via a wire 6 (not shown). For example, the mounting portion 110 of the vibrator 11a passes through the base 10b and a through hole 100b of the bottom portion 100 of the support frame 10a and thus the vibrator 11a is sleeved with the base 10b. For example, if needed, a housing 104 can be formed on a lower side of the bottom portion 100 of the support frame 10a corresponding in position to the through hole 100b so as to encapsulate the mounting portion 110, as shown in FIG. 1C, thereby protecting the mounting portion 110.

Further, the knife 11b such as a ceramic knife serves as a removing tool, which is mounted to the mounting portion 110, located on the lower side of the bottom portion 100 of the support frame 10a and protrudes from the housing 104.

The directed spraying assembly 12 has a nozzle 120 facing the removing assembly 11 and a guiding member 121 connected to the nozzle 120.

Figure 2A:
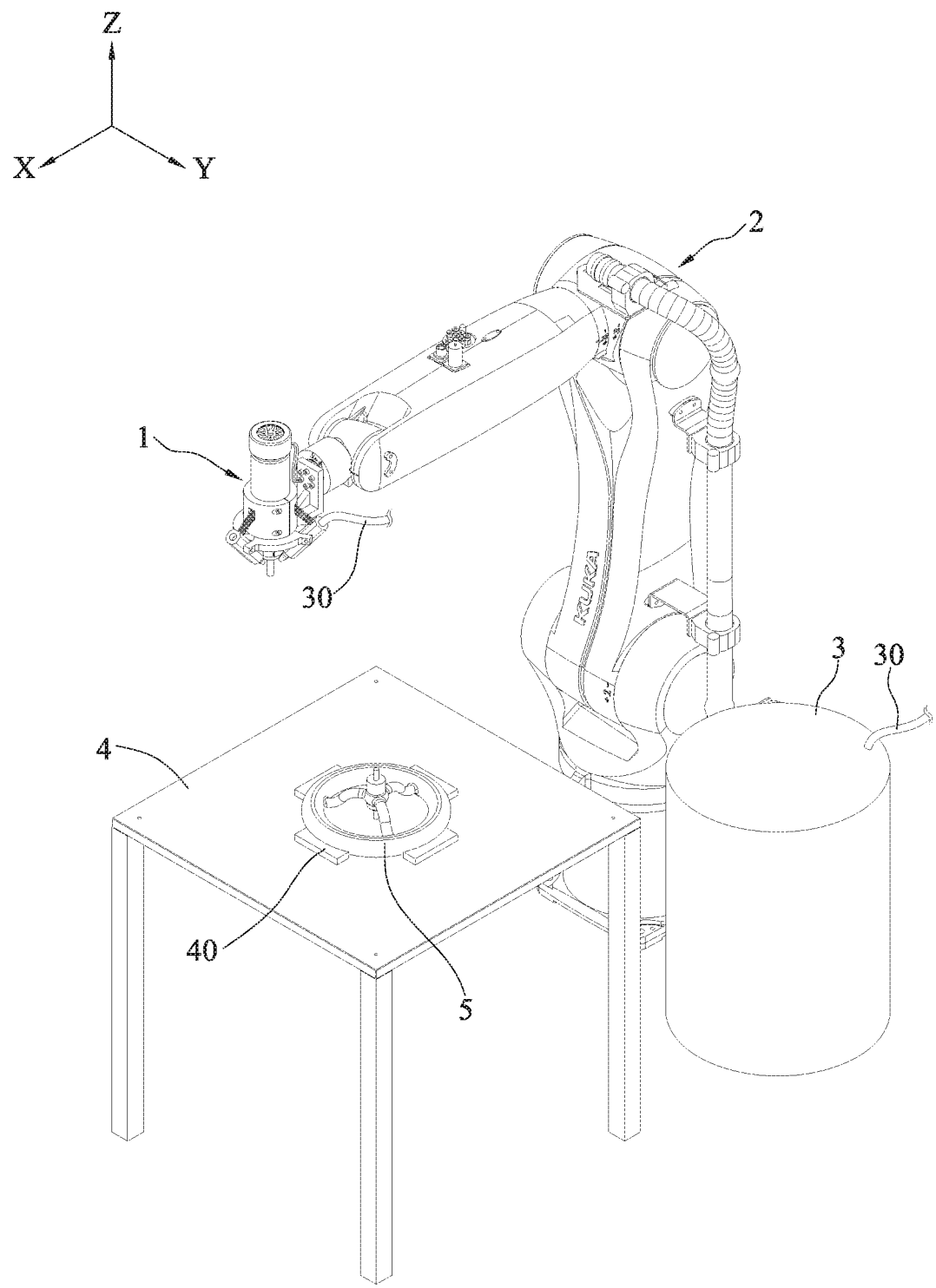
FIG. 2A is a schematic perspective view of a burr trimming device in an operation environment according to the present disclosure.
Figure 2B:
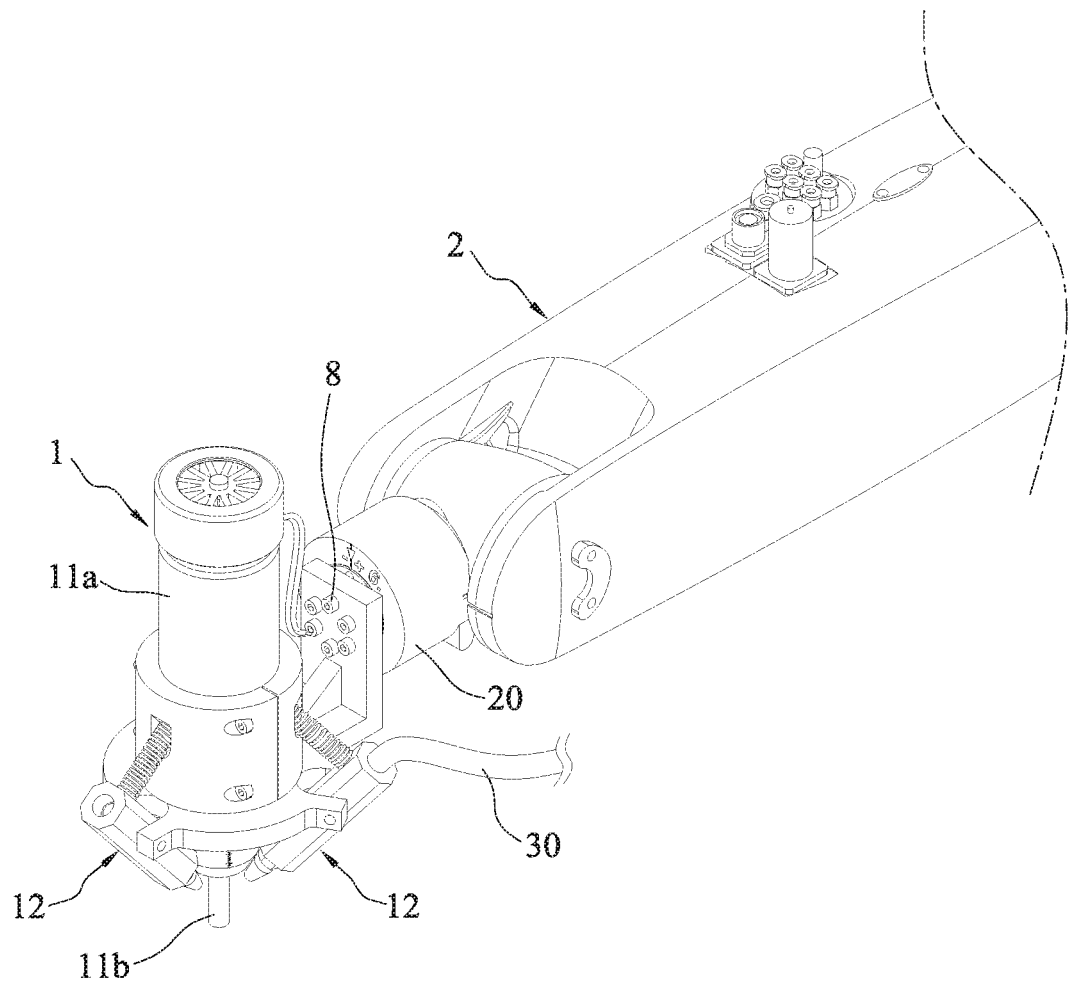
FIG. 2B is a schematic partially enlarged perspective view of FIG. 2A.

In an embodiment, the guiding member 121 is a pipe body having a first port 121a communicated and connected with the nozzle 120 and a second port 121b opposite to the first port 121a and communicated and connected with a pipeline 30, as shown in FIG. 2A. For example, the guiding member 121 has shaft portions 121c formed between the first port 121a and the second port 121b and pivotally engaged to shaft holes 100c of the bottom portion 100 of the support frame 10a of the carrier 10.

Further, the guiding member 121 is disposed on the carrier 10 by an elastic member 122 such as a spring. For example, the guiding member 121 has a positioning protruding portion 121d formed at a position close to the second port 121b, and the engaging portions 102, 103 of the base 10b of the carrier 10 have another positioning protruding portion 103a formed on a peripheral surface thereof. As such, two opposite ends of the elastic member 122 are connected to the positioning protruding portions 121d, 103a, respectively.

Figure 1D:
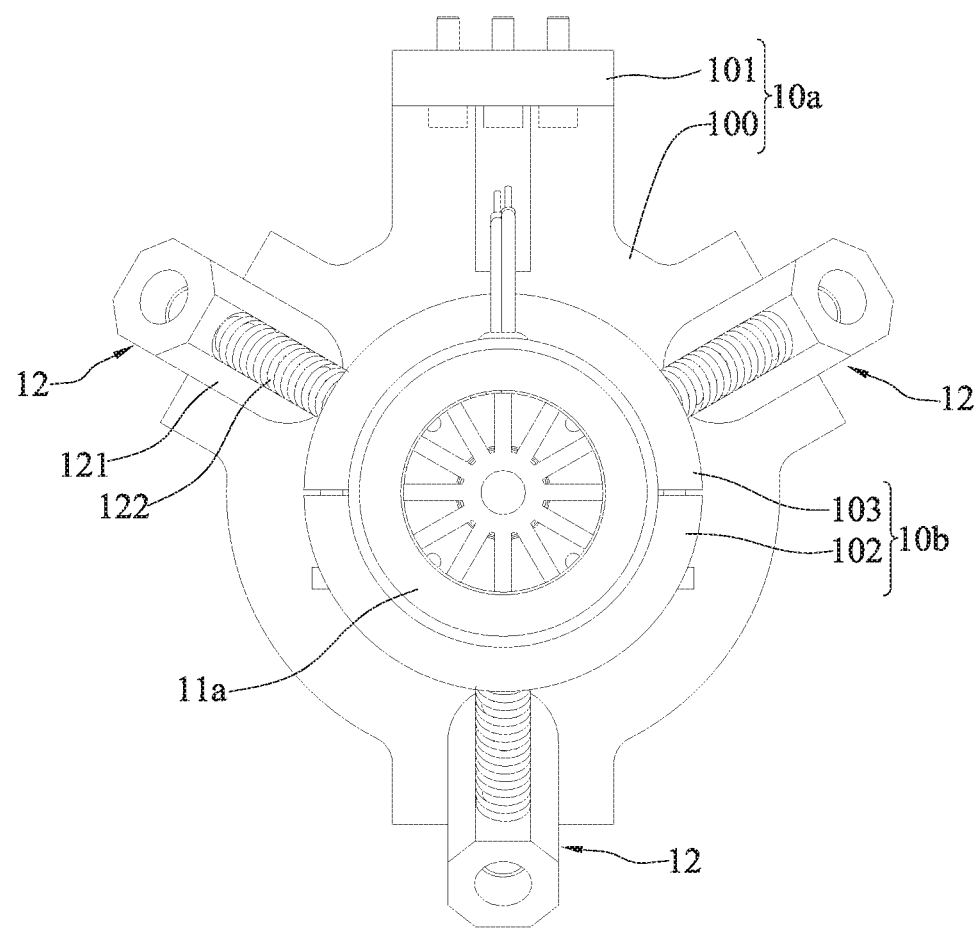
FIG. 1D is a schematic upper plan view of FIG. 1A.

Furthermore, the number of the directed spraying assembly 12 can be determined according to the practical need. For example, three directed spraying assemblies 12 are approximately equally spaced arranged around a periphery of the base 10b (e.g., front, left and right directed spraying assemblies of FIG. 1D). It should be noted that the arrangement of the directed spraying assemblies 12 is not limited thereto.

In addition, the directed spraying assembly 12 is disposed obliquely relative to the vibrator 11a so as to cause the nozzle 120 to face the removing assembly 11.

As shown in FIGS. 1B and 1C, the burr trimming device 1 further has an adjusting structure 13 disposed on the carrier 10 for adjusting the orientation of the nozzle 120 facing the removing assembly 11. The adjusting structure 13 is a ring body disposed around an upper periphery of the housing 104. Further, the adjusting structure 13 has an inclined outer periphery 13c having a substantially arc-shaped profile.

In an embodiment, the guiding member 121 has an abutting portion 123 formed in position close to the first port 121a and coming into contact with the outer periphery 13c. As such, when the adjusting structure 13 is rotated (e.g., in a rotating direction W of FIG. 1C), the adjusting structure 13 is moved up or down along the housing 104 and at this point, the abutting portion 123 is displaced up or down along the outer periphery 13c of the adjusting structure 13. Hence, the guiding member 121 generates a deflected movement through the shaft portions 121c (e.g., in a swing direction R of FIG. 1C) and at the same time, the elastic member 122 is expanded or contracted so as to cause the nozzle 120 to be inclined at a different angle. For example, the abutting portion 123 has a ball shape, an arc-shaped top end of which is in contact with the outer periphery 13c so as to facilitate the displacement of the abutting portion 123 along the outer periphery 13c.

Further, referring to FIG. 1C, if needed, a main scale 13a can be formed around the upper periphery of the adjusting structure 13 and a reference scale 13b can be formed on the outer surface of the housing 104 corresponding to the main scale 13a so as to facilitate determination of the orientation of the nozzle 120 that is adjusted by the adjusting structure 13.

As shown in FIGS. 2A and 2B, the burr trimming device 1 can be used to remove burrs of a steering wheel body 5, and the steering wheel body 5 is fastened to a positioning structure 40 of a platform 4. In particular, when using the burr trimming device 1, the back portion 101 of the support frame 10a of the carrier 10 is fastened to a displacement mechanism 2 such as a mechanical arm (e.g., an adapter plate 20 at an end of the mechanical arm) and a pipeline 30 of a fluid tank 3 used for storing liquid nitrogen is sealing connected to the second port 121b of the guiding member 121 of the directed spraying assembly 12. Then, by displacing the burr trimming device 1 through the displacement mechanism 2, the vibrator 11a (or the knife 11b) of the removing assembly 11 of the burr trimming device 1 is displaced along the profile of the steering wheel body 5. During the movement of the burr trimming device 1, the guiding member 121 of the directed spraying assembly 12 causes the liquid nitrogen of the fluid tank 3 to be sprayed from the nozzle 120 to the steering wheel body 5. After the liquid nitrogen rapidly freezes and hardens the burrs of the steering wheel body 5, the vibrator 11a provides high-frequency vibration (ultrasonic vibration) in the axial direction (arrow Z) to the knife 11b and rotates the knife 11b. As such, when the knife 11b is displaced along the profile of the steering wheel body 5, the knife 11b can crush and remove the hardened burrs of the steering wheel body 5.

Therefore, the burr trimming device 1 of the present disclosure, through cooperation between the directed spraying assembly 12 and the removing assembly 11, enables the knife 11b to remove the hardened burrs by coming into rigid contact therewith so as to ensure complete removal of the fine burrs. Compared with the conventional spraying and blowing removing methods, the burr trimming device 1 of the present disclosure can easily adjust the hardness or sharpness of the knife 11b so as to facilitate to improve the burr trimming accuracy, thus leaving no fine burrs and hence meeting the accuracy requirement of quality management.

Further, even if the mechanical arm has a limited mechanical movement, the knife 11b can shatter the burrs at an irregular area (e.g., a dead corner) of the steering wheel body 5 through vibration and even come into contact with the top of the hardened burrs at the dead corner. Since the flexible burrs are hardened, the hardened flexible burrs can be completely shattered off by vibration, thereby improving the burr trimming effect.

Furthermore, a plurality of directed spraying assemblies 12 are arranged and disposed in a ring shape, which can ensure that the periphery of the knife 11b belongs to the action range of liquid nitrogen, so as to spray liquid nitrogen on the burrs.

Figure 3:
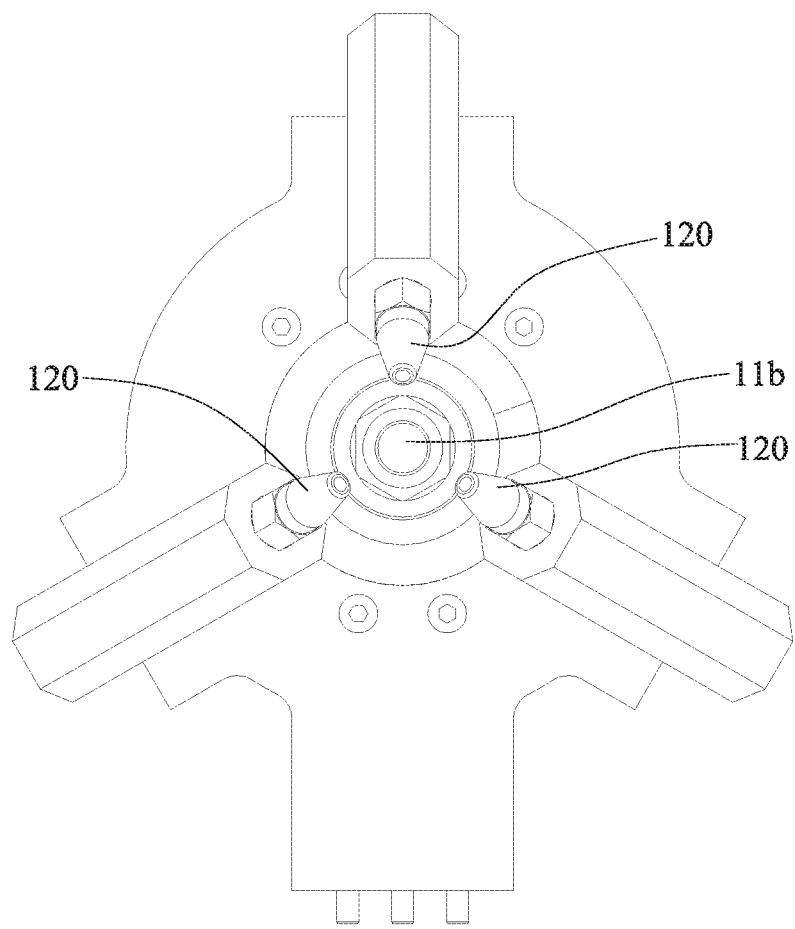
FIG. 3 is a schematic lower plan view of FIG. 1A.

In addition, when a knife 11b of a different specification (such as a length) is installed, by adjusting the orientation of the nozzle 120 of the directed spraying assembly 12 through the adjusting structure 13, the inclined angle of the nozzle 120 can be adjusted so as to cause the liquid nitrogen to be sprayed toward a predetermined position of the knife 11b (e.g., an end of the knife), i.e., directed toward the burrs to be removed by the knife 11b. As such, the liquid nitrogen can be precisely sprayed on the burrs instead of being sprayed on a large area of the steering wheel body 5 that could otherwise destroy the structural strength of the steering wheel body 5. In particular, as shown in FIG. 3, the knife 11b of the removing assembly 11 can be used as a positioning reference for adjusting the mounting of the directed spraying assembly 12. Further, the main scale 13a or the reference scale 13b can be used to record the orientation of the nozzle 120 adjusted by the adjusting structure 13 corresponding to knife 11b.

Therefore, according to the present disclosure, the directed spraying assembly rapidly freezes objects and then the removing assembly removes the objects by coming into rigid contact therewith, thus ensuring complete removal of the objects such as flexible burrs. As such, the present disclosure can change the type of the removing assembly as needed so as to facilitate to improve the burr trimming accuracy, thus leaving no fine burrs and hence meeting the accuracy requirement of quality management.

It should be understood that various kinds of fluids can be used to rapidly freeze the burrs at a low temperature and the present disclosure is not limited to liquid nitrogen. Further, the type of the knife can be selected according to the hardening degree of the burrs.

The above-described descriptions of the detailed embodiments are to illustrate the implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A burr trimming device, comprising:
   a carrier having a support frame and a base disposed on the support frame;
   a removing assembly disposed on the carrier, wherein the removing assembly has an ultrasonic shaft disposed on the carrier, and the ultrasonic shaft passes through the base and the support frame; and
   a directed spraying assembly disposed on the carrier and having a nozzle facing the removing assembly and a guiding member connected to the nozzle, wherein the guiding member is pivotally connected to the support frame,
   wherein the guiding member is disposed on the carrier by spring.

2. The burr trimming device of claim 1, wherein the nozzle is disposed obliquely relative to the ultrasonic shaft.

3. The burr trimming device of claim 1, wherein a plurality of directed spraying assemblies are provided and approximately equally spaced arranged around a periphery of the carrier.

4. The burr trimming device of claim 1, wherein the guiding member is a pipe body having a first port communicated and connected with the nozzle and a second port communicated and connected with a pipeline.

5. The burr trimming device of claim 1, further comprising an adjusting structure disposed on the carrier for adjusting the orientation of the nozzle facing the removing assembly.

6. The burr trimming device of claim 5, wherein the adjusting structure is a ring body.

7. The burr trimming device of claim 6, wherein the ring body has an inclined outer periphery and the directed spraying assembly is in contact with the inclined outer periphery.

8. The burr trimming device of claim 1, wherein the directed spraying assembly is communicated with a fluid tank.

9. The burr trimming device of claim 1, wherein the carrier is externally connected to a displacement mechanism.

* * * * *